United States Patent Office 3,477,340
Patented Nov. 11, 1969

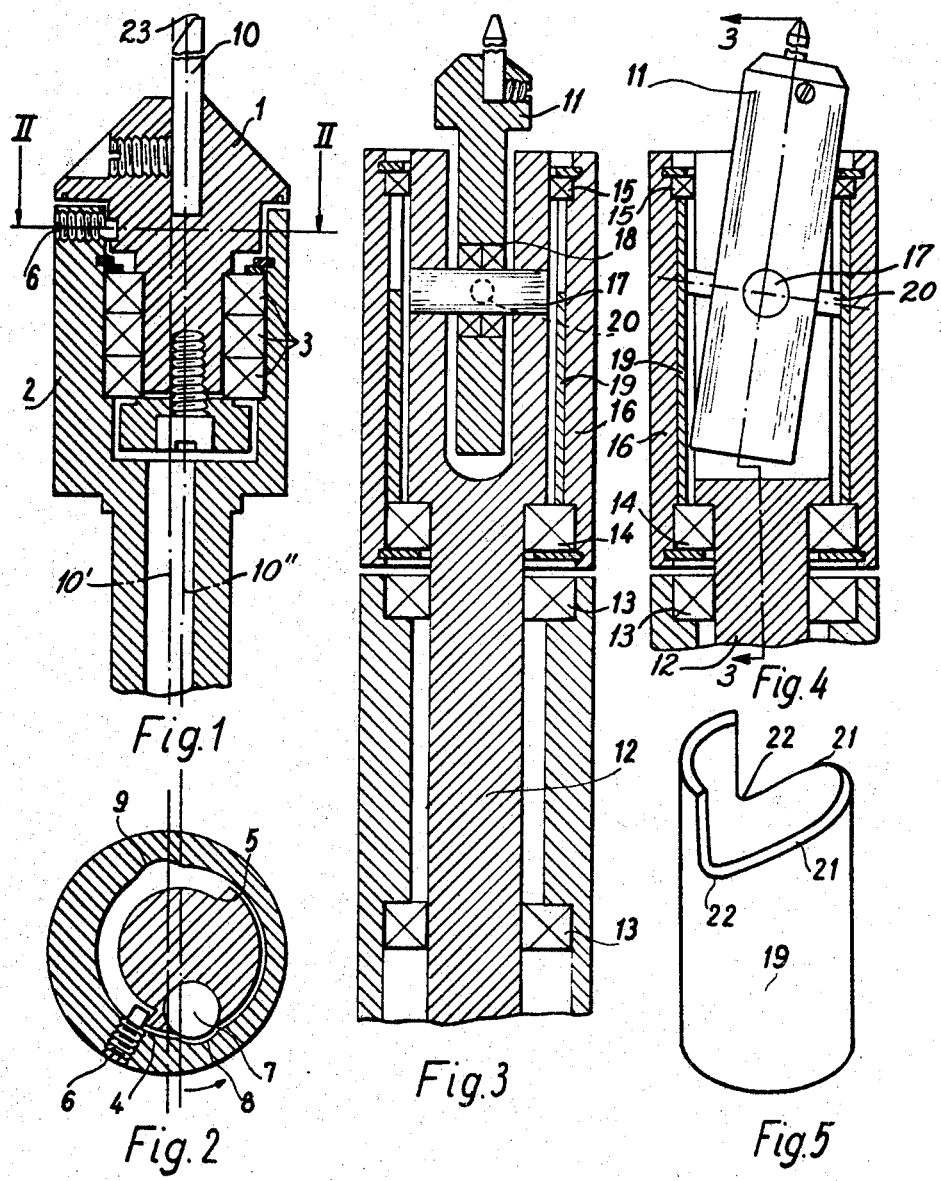

3,477,340
MILLING CUTTER HOLDER
Per Ragnar Faugli, Nuggerudv. 34; Ivar Odd Faugli, Hellerudfaret 21; and Øivind Hegsvold, Tormods vei 15, all of Oslo, Norway
Filed June 1, 1966, Ser. No. 554,391
Claims priority, application Norway, June 9, 1965, 158,421
Int. Cl. B23c 1/00, 3/00, 7/00
U.S. Cl. 90—11   3 Claims

ABSTRACT OF THE DISCLOSURE

A milling cutter comprises a drive spindle rotatable about a first axis, a head carried by the spindle, and a milling cutter tool removably carried by the head. A cutting portion of the tool is asymmetric with respect to the spindle axis, and means are provided such that upon reversal of rotation of the spindle, the head and spindle move relative to each other to reposition the cutter tool relative to the spindle axis. Thus, two different work operations can be performed depending on the direction of rotation.

---

The invention relates to a milling cutter holder in which the milling cutter is removably fixed in a rotatable head.

The purpose of this invention is to furnish a milling cutter holder in which a cutting portion of the milling cutter alternatively, in a simple way, may be brought to the working position with its axis at either of two different distances from the head's axis of rotation. A milling cutter holder of this kind can be used for various special purposes, for example, for the milling away those parts of a stereotype printing plate which are not to be used during printing.

This is achieved according to the invention by the milling cutter being eccentrically fitted in the head, and by the head, depending upon the direction of rotation, being brought from a position in which a cutting portion of the milling cutter is at a small distance from the head's axis of rotation, to a second position in which said cutting portion of the milling cutter is at a greater distance from the head's axis of rotation.

In an expedient design of a milling cutter holder according to the invention, the head may be rotatably supported in a spindle between two stop faces preferably 180 degrees apart, the head being arrested in these two positions with the help of a centrifugal arresting mechanism.

In another expedient design of a milling cutter holder according to the invention, the head may be tiltably supported in a spindle and be fitted with two diametrically situated pegs which coordinate with their respective inclined planes and stop faces in a shell which is rotatably supported on the spindle and which is driven for the operational rotation of the milling cutter holder in such a way that the head, on the direction of rotation being changed, tilts as a result of the coordination between the pegs and the inclined planes and stop faces respectively from the one position to the other.

In both cases the mass forces will, on the direction of rotation being changed, bring the cutter from the one position to the other. The cutter has two edges of which each comes into action in each of the two positions.

Two examples of the invention will be explained in more detail with reference to the drawings.

FIGURE 1 shows a longitudinal section through a first design of a milling cutter holder according to the invention.

FIGURE 2 shows a section along the line II—II in FIGURE 1.

FIGURES 3 and 4 show two longitudinal sections, 90° apart, through another design of a milling cutter holder according to the invention, FIG. 3 being a section on the line 3—3 of FIG. 4.

FIGURE 5 shows in perspective a guiding shell which is a part of the milling cutter holder which is shown in FIGURES 3 and 4.

The milling cutting holder in FIGURES 1 and 2 consists of a head 1 which is rotatably and eccentrically supported in a driving spindle 2 with the help of the ball bearing 3. The head 1 is, on the part which is shown in FIGURE 2, fitted with two stop faces 4 and 5 which together with a stop peg 6 limit the rotatability of the head in relation to the spindle. In the example shown, the rotatability is limited to 180°, but it is clear that the rotatable range may lie within some other required angle of rotation. In order to arrest the head 1 in the spindle 2, there is a cavity in the head for a ball 7 which, by the help of centrifugal force, is thrown out into a cavity 8 or 9 respectively in the inside of the spindle. The head 1 carries the milling cutter tool 10 which, in the usual manner, is fixed by means of a set screw. It is clear that there may be used any other type of centrifugal arresting mechanism than the one described here, and particularly one with straight stopping surfaces, for example a cylinder-formed stopping device.

During the milling operation, the head 1 and spindle 2 rotate as a unit about the axis 10' of the spindle 2. But upon reversal of the direction of rotation of spindle 2, head 1 and spindle 2 rotate a part turn relative to each other about the axis 10" of head 1. The axes 10' and 10" are spaced apart; moveover, the cutting portion 23 of cutter tool 10 is not symmetric about axis 10". Therefore, upon rotation of cutter tool 10 a part turned about axis 10", that cutting portion 23 will have a distinctively different position relative to axis 10' thereby to perform a distinctly different milling operation.

In the example shown in FIGURES 3–5, the head 11 is tiltably supported in a spindle 12 with the help of the ball bearing 18 and a shaft 17, in that the spindle has a diametrical cavity which permits the tilting movement of the head 11. The head, in the region of the shaft 17 and 90° displaced in relation to this, is fitted with two pegs 20 which coordinate with their respective inclined planes 21 and stops 22 on a guiding shell 19 which is shown alone in FIGURE 5. The shell 19 is fixed on the inside of a shell 16, which in turn is rotatably supported on the spindle, with the help of the ball bearings 14 and 15, and which is driven for the operational rotation of the milling cutting holder. On rotating the holder in the one direction the head 11 tilts, as a result of the coordination between the pegs and the inclined plane and stop faces respectively, from one position in which the milling cutter tool, which is eccentrically fixed in the head 11, is at a small distance from the holder's axis of rotation, to a position in which the milling cutter tool is at a large distance from the holder's axis of rotation. To accommodate this tilting movement, the spindle 12 and shell 19 with its attached shell 16 rotate a part turn relative to each other with the help of bearings 14 and 15, in a manner analogous to the rotation of head 1 and spindle 2 a part turn relative to each other in FIGS. 1 and 2.

Thus, upon rotation in one direction, one of the pegs 20 will engage with one of the stops 22, while the other peg 20 rides on a relatively high portion of the inclined planes 21. But upon rotation in the other direction, then the position of the pegs 20 is reversed: the previously elevated peg 20 then slides down against the previously unused stop 22, and the peg 20 which was previously against the first-mentioned stop 22 then rides up onto an elevated portion of inclined planes 21. The result is to swing the head 11 relative to the spindle, as described above.

We claim:

1. A milling cutter holder comprising a spindle rotatable about an axis, a cutter head carried by the spindle, a cutter tool removably carried by the cutter head, means mounting the cutter head for limited movement relative to the spindle between two positions in which a cutting portion of the cutter tool is distinctly differently transversely oriented relative to said axis, and means responsive to reversal of the direction of rotation of the spindle about said axis to move said cutter head from one said position to the other said position.

2. A milling cutter holder as claimed in claim 1, and means mounting said cutter head for rotation on and relative to said spindle about an axis parallel to but spaced from said spindle axis, and detent means between said spindle and said cutter head for maintaining said cutter head in either of two rotative positions less than 360° apart relative to said spindle dependent on the direction of rotation of said spindle.

3. A milling cutter holder as claimed in claim 1, and means mounting said cutter head on said spindle for swinging movement relative to said spindle about an axis transverse to the axis of the spindle, a sleeve, means mounting the sleeve on the spindle for rotation relative to the spindle, and cam means secured to the sleeve and engageable with the cutter head to swing the cutter head about said transverse axis to distinctly different positions depending on the direction of rotation of the spindle.

References Cited
UNITED STATES PATENTS

| | | | |
|---|---|---|---|
| 2,151,251 | 3/1939 | Weidner | 90—175 X |
| 2,182,770 | 12/1939 | Woodcock | 77—58 |
| 2,661,640 | 12/1953 | Ruegg | 77—61 |
| 2,931,254 | 4/1960 | Briney et al. | 77—58 |

ANDREW R. JUHASZ, Primary Examiner

GIL WEIDENFELD, Assistant Examiner

U.S. Cl. X.R.

77—58, 61